United States Patent
Masarwa et al.

(10) Patent No.: US 7,588,201 B2
(45) Date of Patent: *Sep. 15, 2009

(54) IRRIGATION PIPE

(75) Inventors: Abed Masarwa, Taybi (IL); Avi Schweitzer, D. N. Danegev (IL)

(73) Assignee: Netafim Ltd, Tel Aviv (IL)

( * ) Notice: Subject to any disclaimer, the term of this patent is extended or adjusted under 35 U.S.C. 154(b) by 231 days.

This patent is subject to a terminal disclaimer.

(21) Appl. No.: 11/036,384

(22) Filed: Jan. 18, 2005

(65) Prior Publication Data

US 2005/0194469 A1   Sep. 8, 2005

Related U.S. Application Data

(60) Provisional application No. 60/548,957, filed on Mar. 2, 2004.

(51) Int. Cl.
  B05B 15/00 (2006.01)
  F16K 43/00 (2006.01)
  F16K 51/00 (2006.01)

(52) U.S. Cl. .............. 239/547; 239/542; 239/548; 239/550; 137/854; 137/318; 285/5

(58) Field of Classification Search .............. 239/533.1, 239/11, 542, 547, 548, 566, 574, 550; 137/78.2, 137/454.2, 454.5, 454.6
See application file for complete search history.

(56) References Cited

U.S. PATENT DOCUMENTS

| | | | | |
|---|---|---|---|---|
| 3,490,791 A * | 1/1970 | Mitchell | .......................... | 285/5 |
| 3,863,960 A | 2/1975 | Andersson | | |
| 4,095,750 A * | 6/1978 | Gilead | .......................... | 239/542 |
| 4,593,857 A * | 6/1986 | Raz | ............................. | 239/109 |
| 4,654,942 A * | 4/1987 | Rush et al. | ............. | 29/890.144 |
| 4,722,759 A * | 2/1988 | Roberts et al. | .............. | 156/203 |
| 4,732,329 A * | 3/1988 | Martin | ........................ | 239/542 |
| 4,880,167 A | 11/1989 | Langa et al. | | |
| 5,211,426 A * | 5/1993 | Guignard et al. | ................ | 285/5 |
| 5,263,791 A * | 11/1993 | Zeman | ......................... | 405/43 |
| 5,744,779 A * | 4/1998 | Buluschek | .............. | 219/121.71 |
| 6,619,565 B1 * | 9/2003 | Abbott | ........................ | 239/273 |
| 6,681,796 B2 * | 1/2004 | King, Jr. | ..................... | 137/318 |

(Continued)

FOREIGN PATENT DOCUMENTS

GB          833835          5/1960

(Continued)

*Primary Examiner*—Len Tran
*Assistant Examiner*—James S Hogan
(74) *Attorney, Agent, or Firm*—The Nath Law Group; Jerald L. Meyer; Derek Richmond (57) ABSTRACT

An irrigation pipe with a plurality of connector elements adapted for attachment of lateral branches thereto, where the connector elements are integrally fitted to the pipe's wall during the manufacture. Connector elements may be fitted open and be adapted for closing after manufacture if not intended for use, or may be fitted closed and be adapted for opening after manufacture to enable the attachment. A method of production of such irrigation pipe from a strip of flexible weldable or bondable material includes fitting integrally the connector elements to predetermined locations on the strip, with or without punching the strip; bending or twisting the strip so as to juxtapose or overlap lateral edges thereof; and welding or bonding integrally the edges so as to obtain a closed pipe section.

9 Claims, 6 Drawing Sheets

U.S. PATENT DOCUMENTS

| | | |
|---|---|---|
| 2003/0201345 A1 | 10/2003 | Jeong |
| 2004/0046065 A1 | 3/2004 | Jeong |
| 2004/0050975 A1* | 3/2004 | Panourgias et al. ......... 239/542 |

FOREIGN PATENT DOCUMENTS

| | | |
|---|---|---|
| GB | 1 205 983 | 9/1970 |
| GB | 2 187 622 A | 9/1987 |
| JP | 08318177 | 12/1996 |
| WO | 92/05689 A1 | 4/1992 |
| WO | 02/066881 A1 | 8/2002 |
| WO | 03/031164 | 4/2003 |
| WO | 2005/084418 | 9/2005 |

* cited by examiner

IRRIGATION PIPE

This application claims the benefit of prior U.S. application No. 60/548,957 filed Mar. 2, 2004.

FIELD OF THE INVENTION

This invention relates to irrigation pipes, in particular to pipes for assembling branching irrigation networks.

BACKGROUND OF THE INVENTION

Modern irrigation typically employs large pipe networks, for example in drip irrigation systems or in flood systems. An irrigation network includes main water supply pipes and irrigation branches deployed and assembled on the field. The assembly of branches is made usually by specially designed lateral connectors and involves considerable labor costs but does not always prevent leakages.

For example, publications WO 02/066881 and JP08318177 disclose connectors for mounting lateral outlets of small diameter to the wall of a flexible, rollable and collapsible pipe of large diameter. These connectors comprise a tubular member with flaring end and external thread, and a matching nut. The pipe wall is punched in the field, in desired locations on its wall. The flaring end of the connector is then inserted in a wall opening which expands elastically and grips the connector above the flaring end. The connector is secured to the pipe by tightening the nut against the flaring end.

In this application, the term "rollable pipe" means a pipe that is flexible enough to be rolled in a reel for any purpose, e.g. packaging, transportation, storage, sale, etc. The term "collapsible pipe" means a pipe which tends to collapse when left empty, for example lay-flat pipe. A rollable pipe may be or may not be collapsible.

SUMMARY OF THE INVENTION

In accordance with one aspect of the present invention, there is provided an irrigation pipe with a plurality of connector elements for attachment of lateral branches thereto after its manufacture, wherein the connector elements are integrally fitted to the wall of the pipe during the manufacture. The pipe may be rigid, rollable, and collapsible (lay-flat pipe). Preferably, the pipe is adapted for being cut into a plurality of sections each having a plurality of the connector elements. During the manufacture, each of the connector elements may be fitted open and be adapted for closing after manufacture if not intended for use, or may be fitted closed and be adapted for opening after manufacture to enable the attachment. A connector element may be as well fitted open without being adapted for closing.

In one embodiment, the walls of the pipe are punched during the manufacture, and open connector elements are fitted on the holes.

In another embodiment, the connector elements are fitted closed by an enclosure adapted to preserve pipe's fluid tightness under operative pressure. The enclosure may be, for example, a portion of the wall of the pipe, and/or a portion of the connector element, and/or a separate body fitted to the connector element, or may be of other appropriate design. The enclosure may have an annular notch facilitating the opening.

The connector elements may be fitted for example in the following positions:
adjacent the internal surface of said pipe;
adjacent the external surface of said pipe;
embracing portions of the internal and the external surface of said pipe;
embedded between the internal and the external surface of said wall.

The connector elements may be formed from material of the pipe.

Alternatively, the connector element may be a pad fitted closed to the wall and adapted for boring an opening therethrough in the field, thereby enabling the attachment.

Examples of means for attachment of the connector elements to the lateral branches may be: internal or external thread; bayonet lock; a bore with taper adapted for holding a counterpart element of the lateral branch by friction; a bore and usage of material adapted for assembly with a self-tapping counterpart element of the lateral branch, or the like.

In accordance with another aspect of the present invention, there is provided an irrigation pipe with an extended connector element for attachment of lateral branches thereto after manufacture, for example in the field, wherein the extended connector element is integrally fitted to the pipe's wall during manufacture thereof and is adapted for boring through openings in desired locations thereof, such that two or more lateral branches can be attached to these locations.

The extended connector element may be for example an elongated strip extending parallel to the axis of the pipe, or an annulus (ring) or part thereof, or an elongated strip disposed along a helical line, or just any pad large enough to accommodate two or more branch connectors. Preferably, the extended connector element is made of suitable material, such that counterpart elements of the lateral branches may be held in the openings by friction or by self-tapping.

In a pipe manufactured from a flat sheet by joining edges thereof in a seam, the extended connector element may be fitted into the seam.

In accordance with both aspects of the present invention, the pipe may be produced as high or low pressure resistant hose made of polymer materials strengthened by bonded layer or layers such as textile, knitted woven or non-woven fabric, bi-oriented polymer, high stiffness polymer, etc. Polymer materials such as PE, PP, PVC, TPE, elastomers and others may be used.

The pipe may be manufactured by any appropriate process, e.g. extrusion, casting, blowing, welding or bonding of sheet material, etc. In particular, the integral connector elements may be fitted into the pipe during manufacture by extrusion by the method for fitting in-line drip emitters, as for example disclosed in U.S. Pat. No. 5,324,371.

In accordance with yet another aspect of the present invention, there is provided a method for fitting the connector elements to the pipe wall during the production of the pipe from strips of flexible weldable or bondable material, such as polymer sheet, the method including: fitting integrally the connector elements to predetermined locations on the strip, bending or twisting the strip so as to juxtapose or overlap its lateral edges, and welding or bonding integrally the edges so as to obtain a closed pipe section. The method may include punching holes in the predetermined places.

The bending or twisting may be performed such that the connectors remain either inside the pipe or outside the pipe.

The connector elements may be fitted, for example, by welding or bonding, preferably by ultrasonic welding. The edges of the strip may be connected in a straight seam or in a spiral seam.

The integral connectors offer rapid and easy assembly of branching pipes. The integral connectors are reliably fitted during manufacture, yet the user is able to choose the locations of the branches in the field. The non-used connector elements can be easily closed or just may be left unopened. Due to the low profile of the connector elements, the pipe may be rolled in rather tight reels suitable for packaging, transportation, storage and sale, etc. The pipe can be retrieved at the end of the irrigation season. The pipe is cheap, low-weight and low-volume, and allows easy surface and subsurface installation.

BRIEF DESCRIPTION OF THE DRAWINGS

In order to understand the invention and to see how it may be carried out in practice, a number of embodiments will now be described, by way of non-limiting examples only, with reference to the accompanying drawings, in which.

DETAILED DESCRIPTION OF EMBODIMENTS OF THE INVENTION

Figure 1:
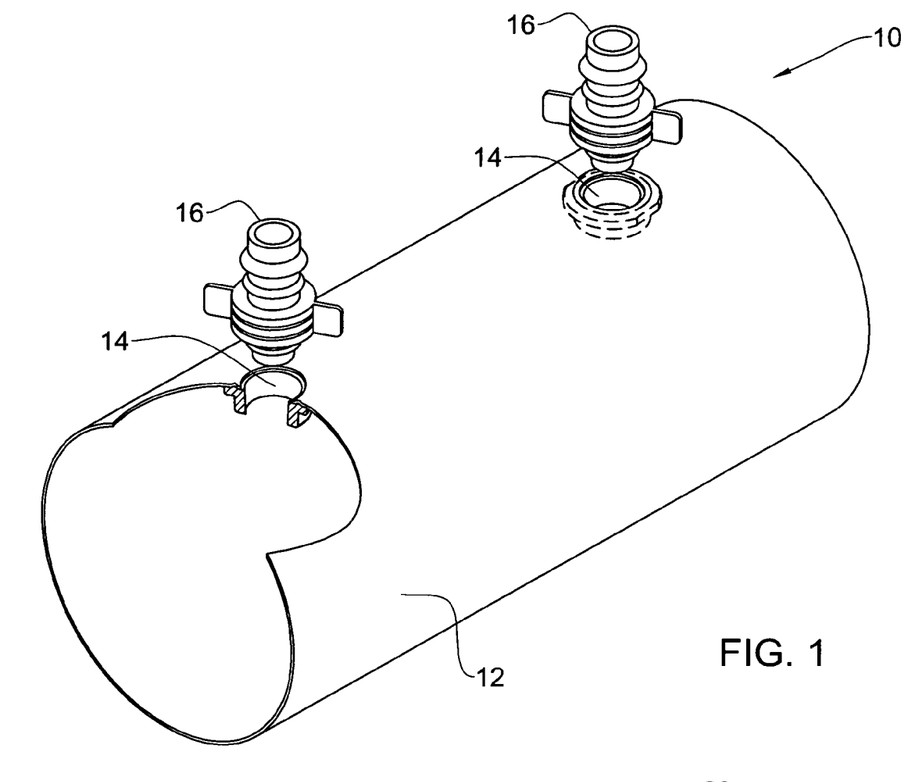
FIG. 1 is a perspective view of an irrigation pipe of the present invention, with integral connector elements and branch connectors.
Figure 2:
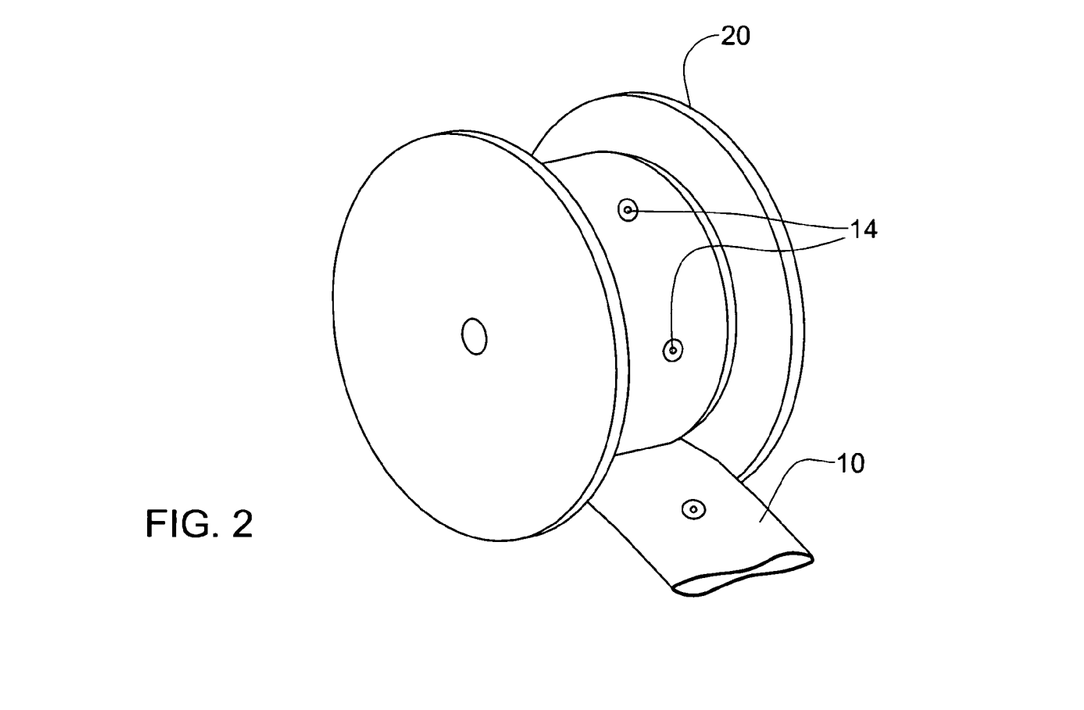
FIG. 2 is an illustration of a collapsible irrigation pipe with integral connectors rolled on a reel.
Figure 3:
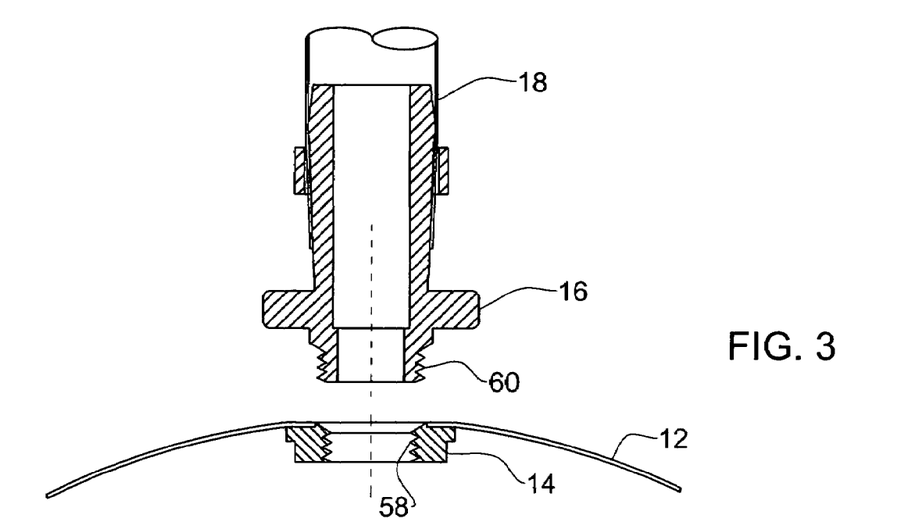
FIG. 3 is a sectional view of an internally fitted threaded connector element in an irrigation pipe, and a lateral branch connector.

With reference to FIGS. 1, 2 and 3, an irrigation pipe 10 of the present invention comprises a pipe 12 and integral pipe connectors 14 fitted to the wall of the pipe during the manufacture. The pipe connectors 14 are adapted for assembly with lateral connectors 16 for branching pipes 18. The pipe 10 may be rolled on a reel 20, as in the example of a collapsible pipe (lay-flat pipe) shown in FIG. 2.

Figure 4A:
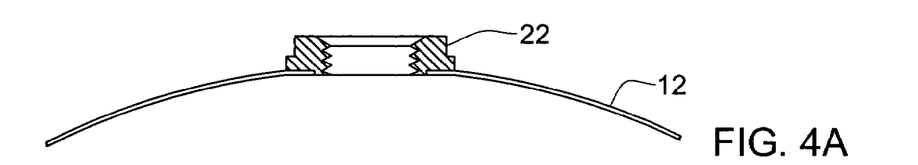
FIG. 4A is a sectional view of an externally fitted threaded connector element.
Figure 4B:
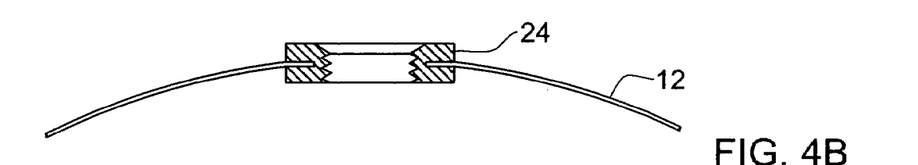
FIG. 4B is a sectional view of a connector element fitting the irrigation pipe from both sides.
Figure 4C:
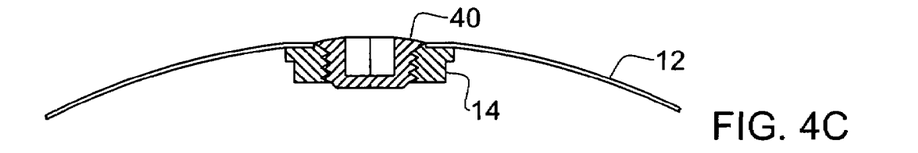
FIG. 4C is a sectional view of a threaded connector element with threaded enclosure.
Figures 10, 11:
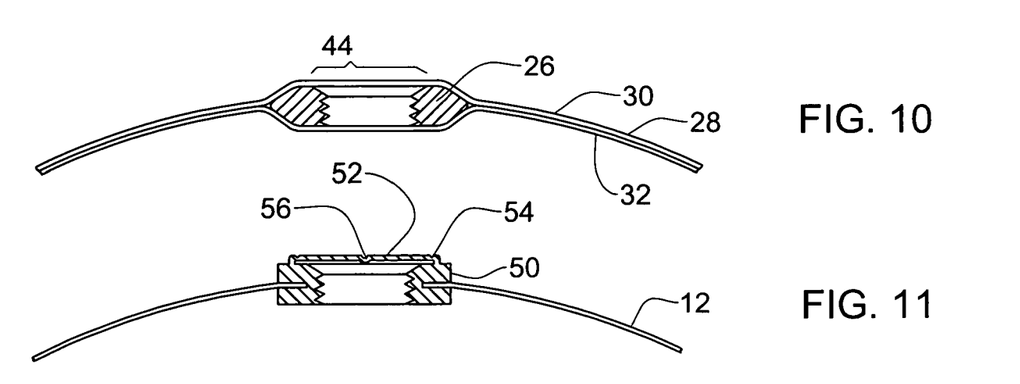
FIG. 10 is a sectional view of a connector element fitted between two layers of an irrigation pipe.
FIG. 11 is a sectional view of a connector element initially closed by an integral notched lid.

FIGS. 3, 4A, 4B and 10 show integral connectors fitted in the following positions:
  adjacent to the internal surface of the pipe 12, connector 14 in FIG. 3;
  adjacent to the external surface of the pipe 12, connector 22 in FIG. 4A;
  embracing portions of the internal and the external surface of the pipe 12, connector 24 in FIG. 4B; and
  embedded in the wall of a pipe 28, between two layers 30 and 32 forming the pipe wall—connector 26 in FIG. 10.

Figure 4D:
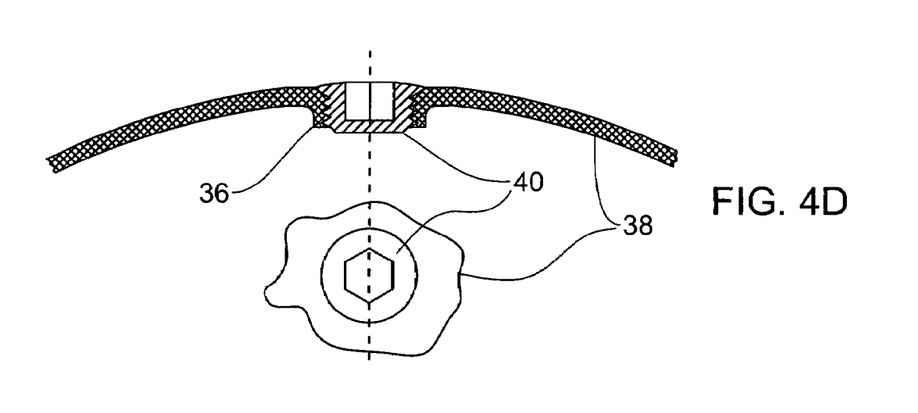
FIG. 4D is a sectional view of a threaded connector element formed from the material of the irrigation pipe wall.

As shown in FIG. 4D, an integral connector 36 may be formed from material of the pipe wall 38.

As seen in FIGS. 3 to 8, the walls of the irrigation pipe 12 may be punched during the manufacture and left open, so that the pipe connectors are fitted open and ready for assembly with the lateral connectors. In this case, the pipe connectors 14, 22, 24, 36 may be provided with caps 40 for closing connectors that will not be used in the field. The caps preserve pipe's fluid tightness under operative pressure.

Figure 9:
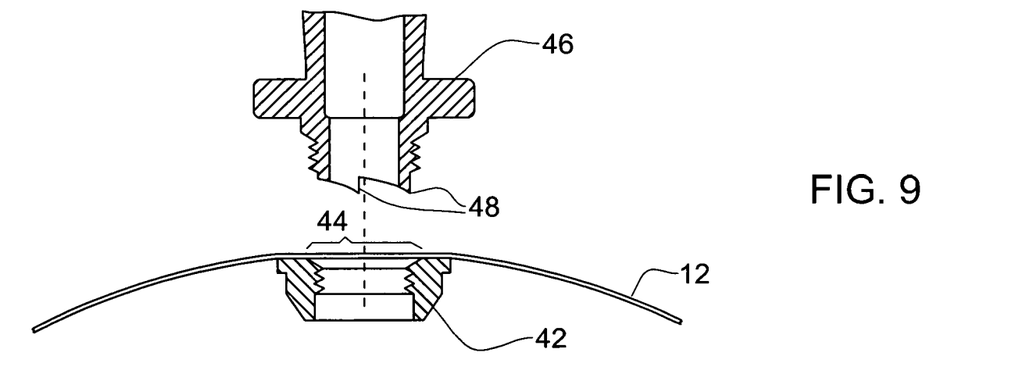
FIG. 9 is a sectional view of an internally fitted connector element initially closed by the pipe wall and a lateral connector with cutting teeth.

Alternatively, as shown in FIGS. 9, 10 and 11, pipe connectors may have integral enclosures preserving pipe's fluid tightness under the operative pressure. Such pipe connectors can be used for assembly after removal of the enclosure which may be material of the wall, of the connector, or both.

In particular, FIGS. 9 and 10 show integral pipe connectors 42 and 26 respectively, closed by a portion 44 of the pipe wall 12. The portion 44 may be cut out before assembly by means of a suitable tool (see, for example, FIG. 12, where such tool is used with connectors of another kind). Alternatively, a lateral connector 46 may be formed with cutting teeth 48. In the latter case, the pipe connector 42 may need higher profile to accommodate safely the teeth 48 after the assembly.

FIG. 11 shows an integral pipe connector 50 made of a single piece of material with enclosure 52. The enclosure 52 may be made formed with means for facilitating its removal, for example, an annular notch 54 and a guiding recess 56 for supporting the tip of a rotary cutting tool.

Figure 5:
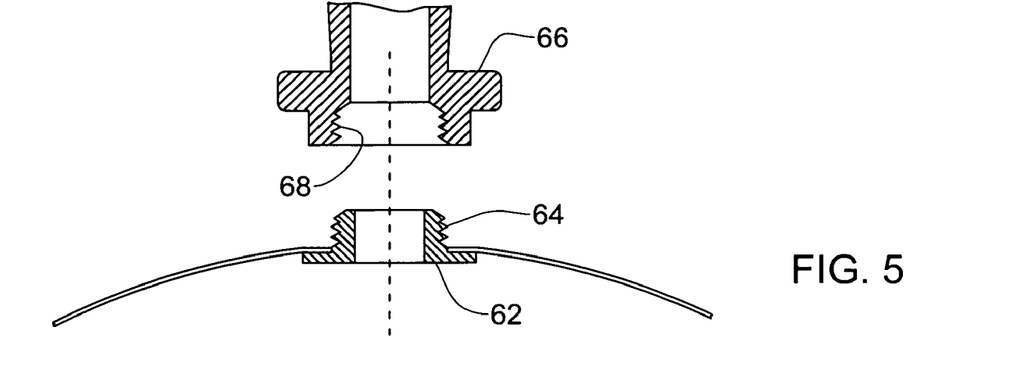
FIG. 5 is a sectional view of a connector element with external thread and a matching lateral connector with internal thread.
Figure 6:
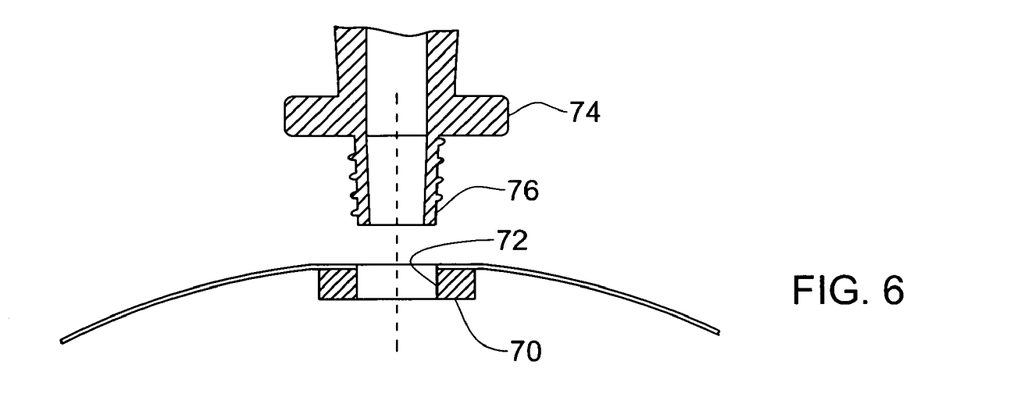
FIG. 6 is a sectional view of a connector element fitted to an irrigation pipe and adapted for assembly with a self-tapping lateral connector.
Figure 7:
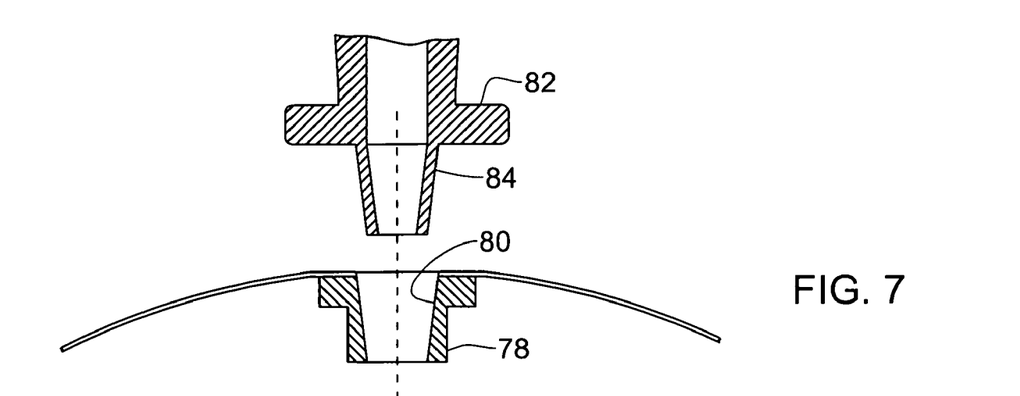
FIG. 7 is a sectional view of a connector element with tapering (cone) bore adapted for friction assembly with a matching tapered lateral connector.
Figure 8:
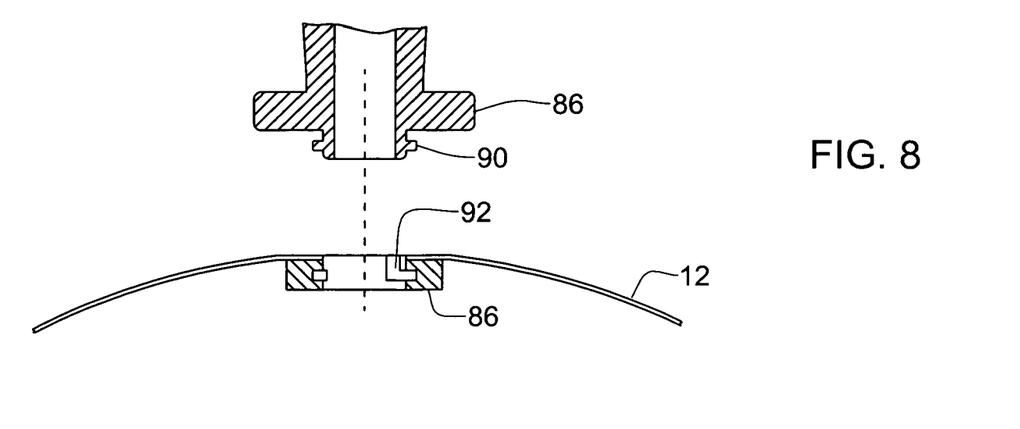
FIG. 8 is a sectional view of an integral connector element and a lateral connector constituting a bayonet lock.

FIGS. 3 and 5 to 8 illustrate a few possible means for assembly of the integral pipe connectors to lateral connectors. FIG. 3 shows the pipe connector 14 with internal thread 58 and a lateral connector 16 with matching external thread 60. As shown in FIG. 5, a pipe connector 62 may be made with external thread 64 while a lateral connector 66 may have an internal thread 68. FIG. 6 shows a pipe connector 70 with smooth bore 72 made of relatively soft material while a lateral connector 74 is made with threaded nozzle 76 of relatively hard material such that the nozzle 76 can be self-tapped into the bore 72. FIG. 7 shows a pipe connector 78 with a tapered (conical) bore 80 and a matching lateral connector 82 with tapered nozzle 84. The angle of taper and the materials of the connectors are selected so as to provide reliable grip by friction after assembly. FIG. 8 shows an integral pipe connector 86 and a lateral connector 88 formed as matching parts of a bayonet lock with lugs 90 and L-shaped channels 92.

Figure 12:
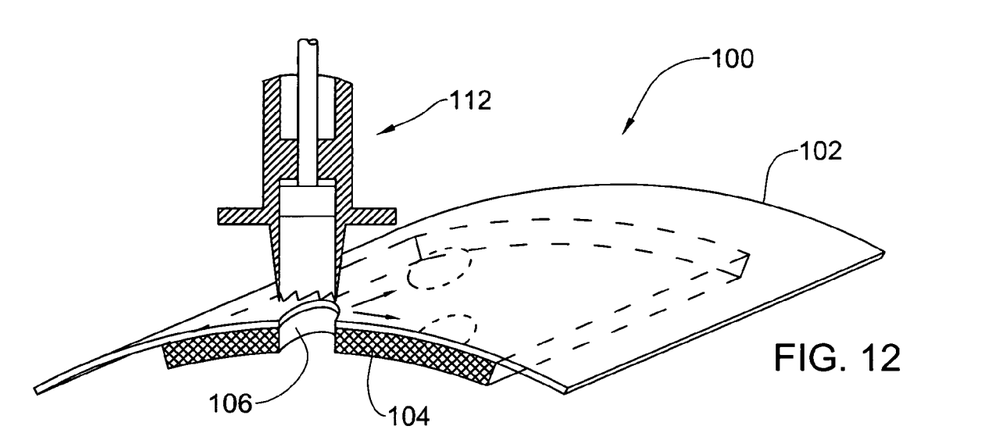
FIG. 12 is a sectional perspective view of an irrigation pipe of the present invention, with integral connector elements of a second type, prepared for boring.
Figure 13:
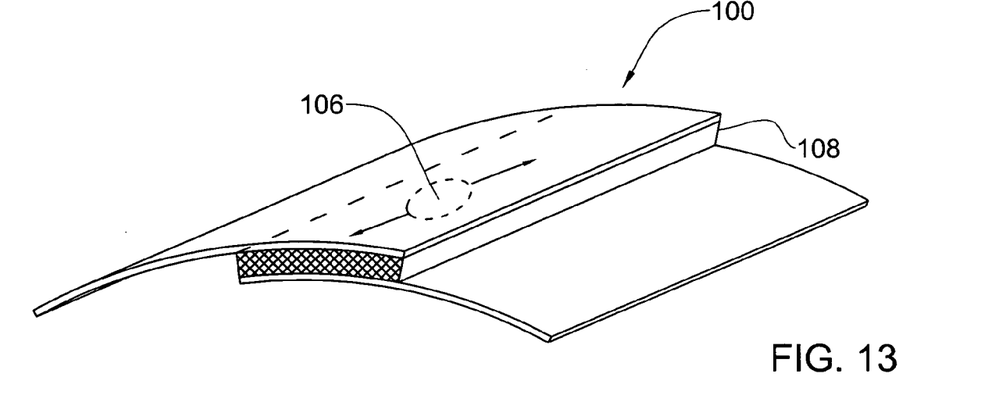
FIG. 13 is a sectional perspective view of an integral connector element of the second type fitted in a longitudinal overlap seam of an irrigation pipe.
Figure 14:
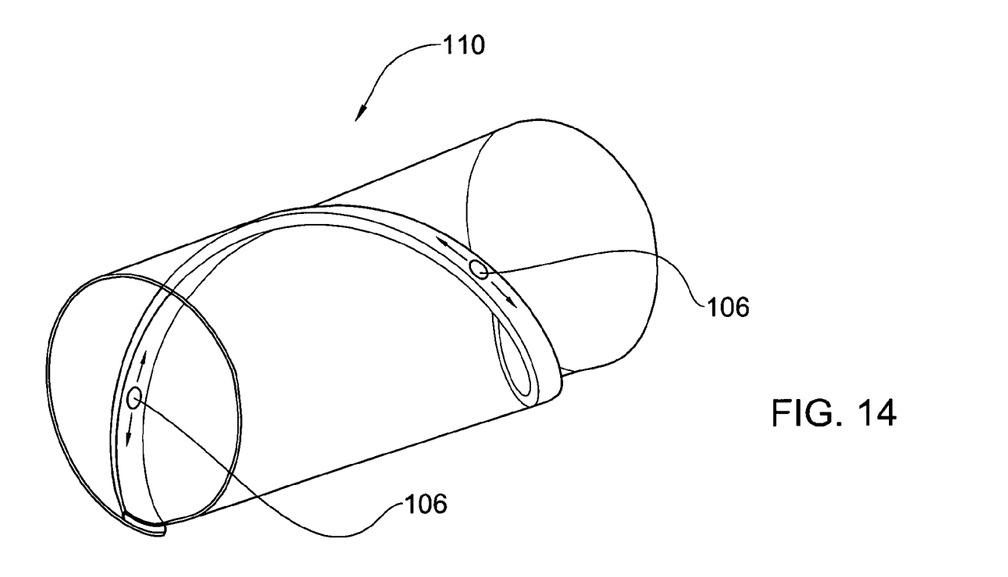
FIG. 14 is a perspective view of a spiral-welded irrigation pipe with a connector element of the second type fitted in a spiral seam.

In accordance with another aspect of the present invention illustrated in FIGS. 12 to 14, an irrigation pipe 100 comprises a flexible pipe 102 and an extended connector element 104 which is integrally fitted to the pipe's wall during manufacture. The extended connector element 104 has sufficient size, such that a plurality of bores 106 can be made and lateral connectors can be attached in desired locations after the manufacture. As seen in FIG. 13, a band 108 of suitable material can be fitted along the irrigation pipe 100 as a continuous integral pipe connector. Such band is especially suitable for fitting in an overlapping seam, for example in a spiral-welded pipe 110 as shown in FIG. 14, or in the straight-seam pipe 100 of FIG. 13.

The integral connector element 104 or 108 may be bored by a rotary tool, such as the tool 112 in FIG. 12, for assembly with a self-tapping lateral connector such as 74 in FIG. 6, or with a tapered lateral connector held by friction, such as 82 in FIG. 7.

Figure 15:
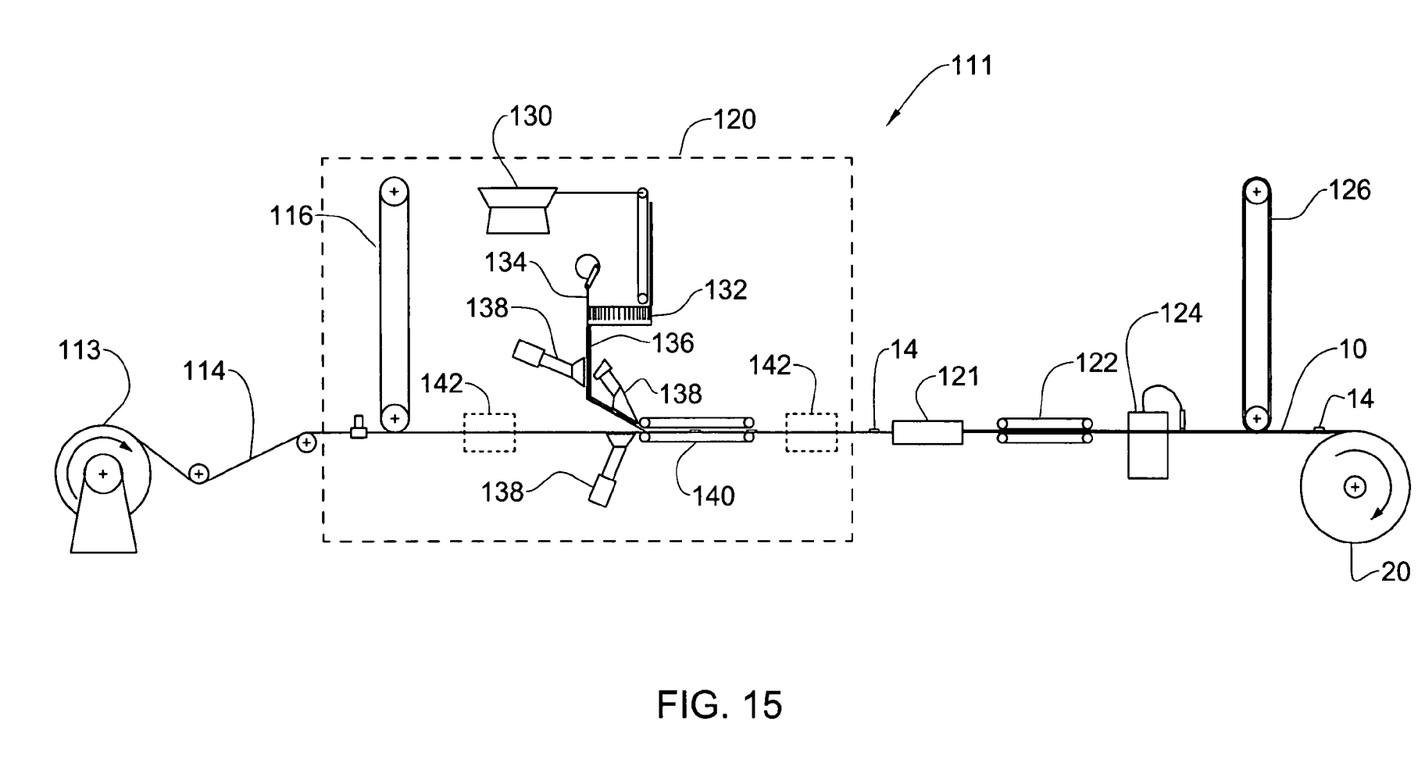
FIG. 15 shows a production scheme of a rollable pipe with integral connectors.

With reference to FIG. 15, there is shown an exemplary production scheme of a rollable polymer pipe 10 with integral connectors 14, according to yet another aspect of the present invention. The production is performed on a conveyor line 111 including: feeding reel 113 for feeding raw strip material 114, strip accumulator 116, connectors fitting section 120, piping apparatus 121, puller 122, printing and monitoring station 124, pipe accumulator 126, and a receiving reel 20 for the pipe 10.

The connectors fitting section 120 includes connectors stock feeder 130, a drum magazine 132, a feeding plunger 134, a chute 136, welding equipment units 138, a pulling unit 140, and an optional punching device 142.

In the operation of the conveyor, the raw polymer sheet material is first cut into strips 114 of predetermined width, and is wound on feeding reels 113 (this process is done before the reel 113 is loaded to the line 111). The strip 114 is fed to the accumulator 116 and further to the connector fitting section 120.

In the connector fitting section 120, the connectors feeder 130 loads the drum magazine 132 with pipe connectors 14 arranging them in predetermined orientation. The drum magazine 132 rotates in steps, at predetermined intervals of time, and the feeding plunger 134 periodically pushes a connector 14 down the chute 136. The connector is directed to the welding units 138.

The raw strip 114 is also directed to the welding units 138, the connector 14 is positioned on the flat strip 114 and ultrasonic welding or RF (microwave) welding is performed. The strip 114 is pulled by the puller unit 140. The strip 114 may be optionally punched at the openings of the connectors in the punching device 142, before or after the welding, in dependence, for example, on the configuration of the connector.

The strip 114 with welded connectors 14 is then fed to the piping apparatus 121. There, the strip is bent (twisted) into a sleeve with juxtaposed or overlapping edges, and the edges are welded by a watertight seam into a pipe with closed section. The connectors may remain either at the outer side of the pipe, or at the inside, as desired. The pipe 10 may be welded by the same method as the connectors, or by a different one.

The ready pipe 10 is pulled by the puller 122, checked and stamped in the printing and monitoring station 124 and, via the accumulator 126, is wound on the receiving reel 20.

Although a description of specific embodiments and methods has been presented, it is contemplated that various changes could be made without deviating from the scope of the present invention. For example, the integral connectors may be arranged in two rows along the pipe, or may be fitted with tearable caps similar to ones in liquid bags. The fitting of the integral connectors may be performed by pressing, press-heating or other methods. The pipe may be punched before fitting the connectors, etc. The method of fitting to the strip before forming a closed pipe may be used for attaching other irrigation elements such as drip emitters or sprinklers (nozzles).

The invention claimed is:

1. An irrigation pipe comprising:
   a plurality of connector elements adapted for attachment of lateral branches thereto after the manufacture thereof, wherein
   said connector elements are integrally fitted to the wall of said pipe during said manufacture, wherein
   said connector elements each comprise an external thread, wherein
   said external thread resides on a portion of each of said connector elements which projects out from a wall of the pipe, and wherein,
   during said manufacture, each of said connector elements is either fitted open and is adapted for closing after manufacture if not intended for use, or is fitted closed and is adapted for opening after manufacture to enable said attachment.

2. A pipe as claimed in claim 1, wherein said pipe is adapted for being cut into a plurality of sections each having a plurality of said connector elements.

3. A pipe as claimed in claim 1, wherein said pipe is rollable on a reel.

4. A pipe as claimed in claim 3, wherein said pipe is collapsible.

5. A pipe as claimed in claim 1, wherein at least one of said connector elements is open and is fitted on a hole punched in said wall during said manufacture.

6. A pipe as claimed in claim 1, wherein said connector elements are fitted adjacent an inner surface of the wall of said pipe.

7. A pipe and connector set, the set comprising:
   the irrigation pipe of claim 1; and
   two or more lateral connectors for attachment of lateral branches to the irrigation pipe, wherein
   said lateral connectors each comprise an internal thread sufficiently spaced to thread with said external thread.

8. A pipe and connector set as claimed in claim 7, the set further comprising:
   lateral branches, each comprising a body wall, into which said lateral connectors are fitted in one of the following positions: adjacent the internal surface of said body wall; adjacent the external surface of said body wall; embracing portions of the internal and the external surface of said body wall; embedded between the internal and the external surface of said body wall.

9. A pipe as claimed in claim 1, wherein said pipe is manufactured from a flat sheet by joining edges thereof in a seam and said extended connector element is fitted into said seam.

* * * * *